US 12,055,529 B2

(12) United States Patent
Minato et al.

(10) Patent No.: US 12,055,529 B2
(45) Date of Patent: Aug. 6, 2024

(54) LIQUID CHROMATOGRAPH AND ANALYSIS METHOD

(71) Applicant: SHIMADZU CORPORATION, Kyoto (JP)

(72) Inventors: Hiroyuki Minato, Kyoto (JP); Nobumitsu Fukushima, Kyoto (JP); Erika Baba, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 262 days.

(21) Appl. No.: 17/796,644

(22) PCT Filed: Feb. 21, 2020

(86) PCT No.: PCT/JP2020/007234
§ 371 (c)(1),
(2) Date: Jul. 30, 2022

(87) PCT Pub. No.: WO2021/166255
PCT Pub. Date: Aug. 26, 2021

(65) Prior Publication Data
US 2023/0057667 A1    Feb. 23, 2023

(51) Int. Cl.
*G01N 30/54*    (2006.01)
*G01N 30/02*    (2006.01)
*G01N 30/30*    (2006.01)

(52) U.S. Cl.
CPC .............. *G01N 30/54* (2013.01); *G01N 30/30* (2013.01); *G01N 2030/027* (2013.01); *G01N 2030/3007* (2013.01); *G01N 2030/3084* (2013.01)

(58) Field of Classification Search
CPC .. G01N 30/54; G01N 30/30; G01N 2030/027; G01N 2030/3007; G01N 2030/3084
See application file for complete search history.

(56) References Cited

U.S. PATENT DOCUMENTS 10,241,092 B2 * 3/2019 Kanai .................... G01N 30/30
2005/0274174 A1 12/2005 Tai et al.
(Continued)

FOREIGN PATENT DOCUMENTS

JP    2007-523351 A    8/2007
JP    2015-172586 A    10/2015

OTHER PUBLICATIONS

International Search Report for corresponding Application No. PCT/JP2020/007234, mailed Apr. 7, 2020.
(Continued)

*Primary Examiner* — Kristina M Deherrera
*Assistant Examiner* — Jean F Morello
(74) *Attorney, Agent, or Firm* — Renner, Otto, Boisselle & Sklar, LLP (57) ABSTRACT

A first attachment portion to which a packed column is attachable and a second attachment portion to which a chip column is attachable are housed in a column oven. Designation of a temperature of the column oven is received by a designated temperature receiver. In a case in which the chip column is not attached to the second attachment portion, an upper limit temperature of the column oven is set to a first temperature by a setter. An upper limit temperature of the column oven is set to a second temperature lower than the first temperature in a case in which the chip column is attached to the second attachment portion. A temperature of the column oven is adjusted to a received temperature by a temperature adjuster in a case in which the received temperature is equal to or lower than an upper limit temperature.

7 Claims, 5 Drawing Sheets

(56) References Cited

U.S. PATENT DOCUMENTS

| | | |
|---|---|---|
| 2012/0024399 A1 | 2/2012 | Prentice et al. |
| 2012/0037724 A1 | 2/2012 | Prentice et al. |
| 2014/0319042 A1 | 10/2014 | Prentice et al. |
| 2015/0260694 A1* | 9/2015 | Matsuoka .............. G01N 30/30 73/23.41 |
| 2015/0290644 A1 | 10/2015 | Prentice et al. |

OTHER PUBLICATIONS

Written Opinion for corresponding Application No. PCT/JP2020/007234, mailed Apr. 7, 2020 (English machine translation).

* cited by examiner

IN CASE IN WHICH CHIP COLUMN IS NOT ATTACHED

| FIRST TEMPERATURE | SECOND TEMPERATURE | UPPER LIMIT TEMPERATURE |
|---|---|---|
| 60 [°C] | 50 [°C] | 60 [°C] |

FIG. 6

IN CASE IN WHICH CHIP COLUMN IS ATTACHED

| FIRST TEMPERATURE | SECOND TEMPERATURE | UPPER LIMIT TEMPERATURE |
|---|---|---|
| 60 [°C] | 50 [°C] | 50 [°C] | ns
LIQUID CHROMATOGRAPH AND ANALYSIS METHOD

TECHNICAL FIELD

The present invention relates to a liquid chromatograph and an analysis method.

BACKGROUND ART

In a liquid chromatograph, a sample to be analyzed is supplied to a separation column together with a mobile phase. The sample that has been introduced into the separation column is separated into components based on differences in chemical property or composition and is guided to a detector together with the mobile phase. In the detector, the sample that has been separated by the separation column is detected. A liquid chromatogram is generated based on a result of detection by the detector.

[Patent Document 1] JP 2007-523351 A
[Patent Document 2] JP 2015-172586 A

SUMMARY OF INVENTION

Technical Problem

In recent years, part of a flow path formed on a substrate may be used as a separation column (see Patent Documents 1 and 2, for example). However, a separation column (hereinafter referred to as a chip column) having a structure in which a flow path is formed on a substrate has relatively low heat resistance. Therefore, in a case in which a sample is analyzed under a high-temperature condition, the chip column may be damaged. Therefore, in order to prevent the chip column from being damaged, it is necessary to appropriately manage the temperature of a liquid chromatograph.

An object of the present invention is to provide a liquid chromatograph and an analysis method that enables appropriate management of a temperature.

Solution to Problem

One aspect of the present invention relates to a liquid chromatograph including a first attachment portion to which a packed column is attachable, a second attachment portion to which a chip column having a flow path that functions as a separation column on a substrate is attachable, a column oven that houses the first and second attachment portions, a designated temperature receiver that receives designation of a temperature of the column oven, a setter that sets an upper limit temperature of the column oven to a first temperature in a case in which the chip column is not attached to the second attachment portion, and sets an upper limit temperature of the column oven to a second temperature lower than the first temperature in a case in which the chip column is attached to the second attachment portion, and a temperature adjuster that adjusts a temperature of the column oven to a temperature received by the designated temperature receiver in a case in which the temperature received by the designated temperature receiver is equal to or lower than an upper limit temperature set by the setter.

Another aspect of the present invention relates to an analysis method performed by a liquid chromatograph, wherein s first attachment portion to which a packed column is attachable and a second attachment portion to which a chip column having a flow path that functions as a separation column on a substrate is attachable are housed in a column oven, and the analysis method includes the steps of receiving designation of a temperature of the column oven, setting an upper limit temperature of the column oven to a first temperature in a case in which the chip column is not attached to the second attachment portion, and setting an upper limit temperature of the column oven to a second temperature lower than the first temperature in a case in which the chip column is attached to the second attachment portion, and adjusting a temperature of the column oven to a received temperature in a case in which the received temperature is equal to or lower than a set upper limit temperature.

Advantageous Effects of Invention

With the present invention, the temperature of a liquid chromatograph can be managed appropriately.

DESCRIPTION OF EMBODIMENTS

A liquid chromatograph and an analysis method according to embodiments of the present invention will be described below in detail with reference to the drawings. In the following description, a separation column having a flow path filled with a particulate filler (stationary phase) is referred to as a packed column. A separation column having a flow path on a substrate is referred to as a chip column. A substrate is constituted by a semiconductor chip or a ceramic chip, for example. In a chip column, a flow path on a substrate functions as a separation column.

(1) Configuration of Liquid Chromatograph

Figure 1:
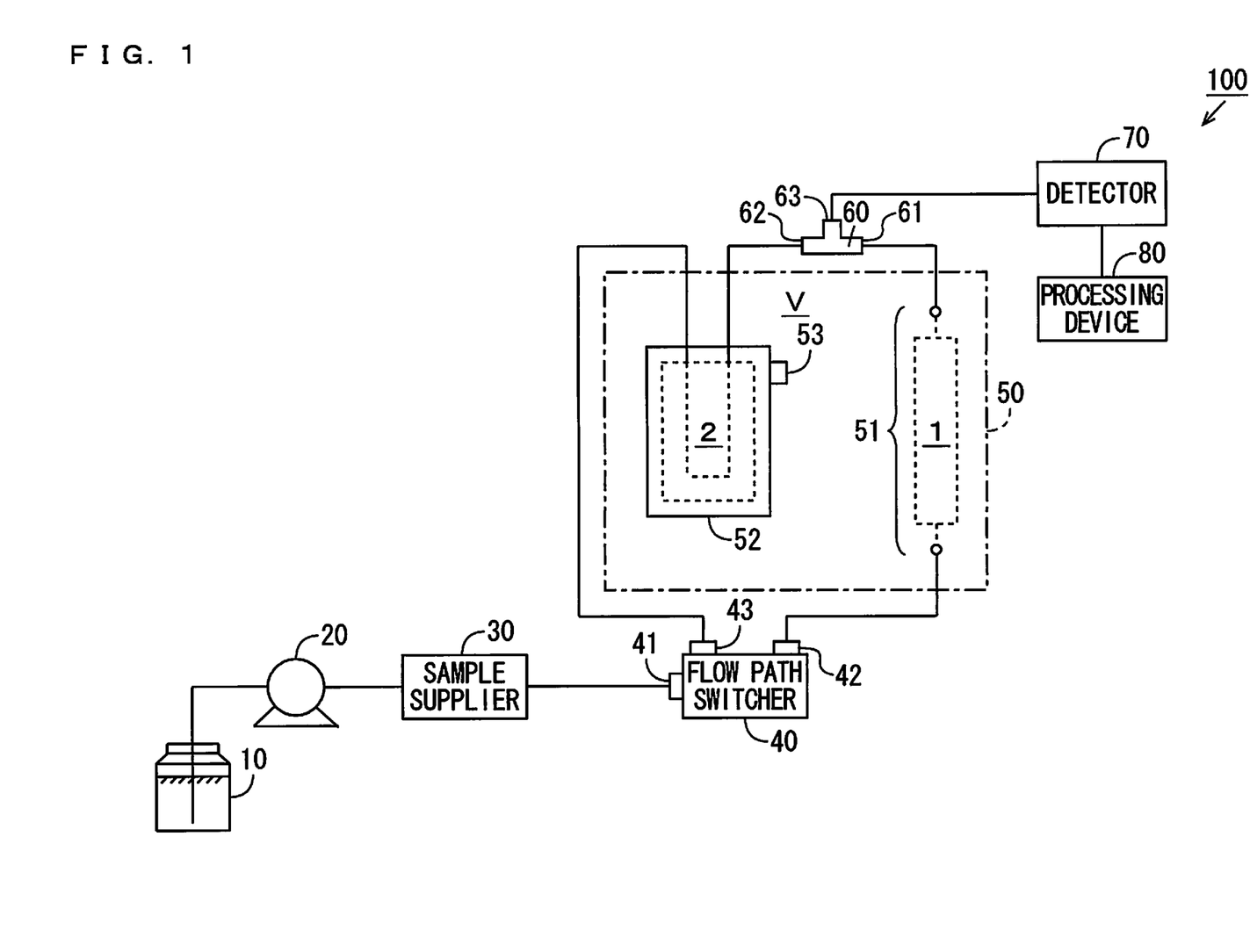
FIG. 1 is a schematic diagram showing the configuration of a liquid chromatograph according to one embodiment of the present invention.

FIG. 1 is a schematic diagram showing the configuration of the liquid chromatograph according to one embodiment of the present invention. As illustrated in FIG. 1, the liquid chromatograph 100 includes a mobile phase container 10, a liquid sender 20, a sample supplier 30, a flow path switcher 40, a column oven 50, a three-way joint 60, a detector 70 and a processing device 80.

The mobile phase container 10 stores a mobile phase such as an aqueous solution or an organic solvent. The liquid sender 20 is a pump, for example, and introduces a mobile phase stored in the mobile phase container 10 into the flow path switcher 40 by pumping the mobile phase. The sample supplier 30 is a sample injector, for example, and supplies a sample to be analyzed to a mobile phase pumped by the liquid sender 20. The flow path switcher 40 is a valve having an inlet port 41 and outlet ports 42, 43, for example, and selectively leads out a mobile phase (a mobile phase includes a sample. The same also applies to the following) that has been introduced into the inlet port 41 from the outlet port 42 or the outlet port 43.

The column oven 50 houses attachment portions 51, 52. The attachment portions 51, 52 are respectively examples of first and second attachment portions. The attachment portion 51 is configured such that the packed column 1 can be attached thereto. Specifically, a user can attach the packed column 1 to the attachment portion 51 by fastening a fixture such as a nut using a tool such as a spanner. Further, the user can detach the packed column 1 from the attachment portion 51 by loosening a fixture using a tool.

The attachment portion 52 is configured such that the chip column 2 can be attached thereto. Specifically, the user can attach the chip column 2 to the attachment portion 52 by inserting the chip column 2 from an insertion port (not shown) provided in the attachment portion 52. Further, the user can detach the chip column 2 from the attachment portion 52 by operating a discharge button (not shown) provided at the attachment portion 52. Therefore, the chip column 2 is better than the packed column 1 in terms of workability such as replacement or maintenance.

A determiner 53 is attached to the attachment portion 52. The determiner 53 includes a sensor such as a photosensor or a microswitch, and determines whether the chip column 2 is attached to the attachment portion 52. Further, the determiner 53 provides a result of determination to the processing device 80.

The three-way joint 60 has inlet ports 61, 62 and an outlet port 63. A mobile phase led out from the outlet port 42 of the flow path switcher 40 is introduced into the inlet port 61 of the three-way joint 60 through the packed column 1 attached to the attachment portion 51 of the column oven 50. The packed column 1 retains sample components for different periods of time depending each component of a sample in a mobile phase passing therethrough, and the affinity between the packed column 1 and the mobile phase.

A mobile phase led out from the outlet port 43 of the flow path switcher 40 is guided to the inlet port 62 of the three-way joint 60 through the chip column 2 attached to the attachment portion 52 of the column oven 50. The chip column 2 retains sample components for different periods of time depending on each component of a sample in a mobile phase passing therethrough, and the affinity between the chip column 2 and the mobile phase. The three-way joint 60 leads out a mobile phase that has been introduced into the inlet port 61 or the inlet port 62 from the outlet port 63.

The detector 70 includes an absorbance detector or an RI (Refractive Index) detector, for example, and sequentially detects sample components in a mobile phase led out from the outlet port 63 of the three-way joint 60. The processing device 80 includes a CPU (Central Processing Unit) or a microcomputer, and controls the operations of the liquid sender 20, the sample supplier 30, the flow path switcher 40, the column oven 50 and the detector 70. Further, the processing device 80 generates a liquid chromatogram representing the relationship between a retention time and a detection intensity of each component by processing a result of detection by the detector 70. Details of the processing device 80 will be described below.

(2) Processing Device

Figure 2:
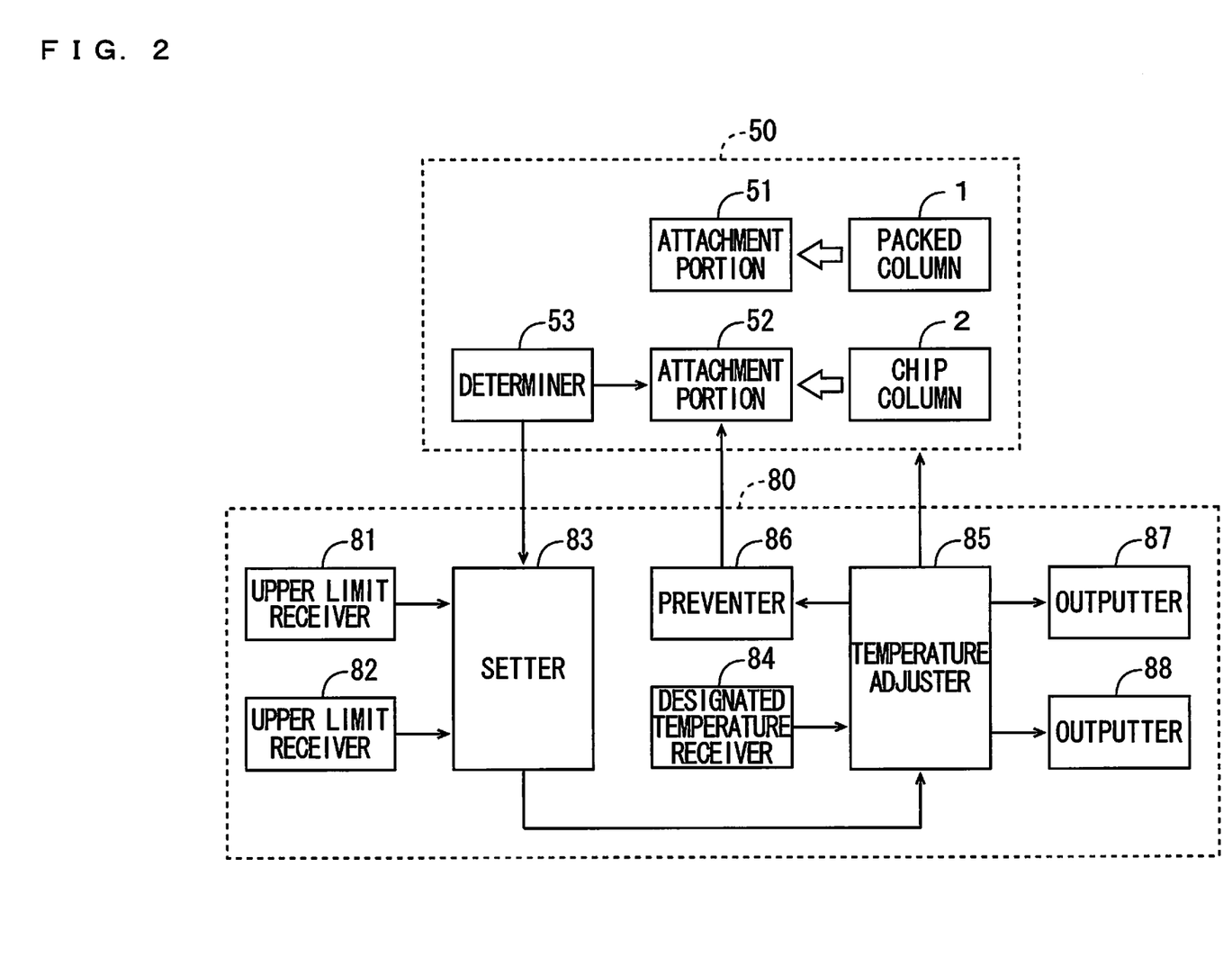
FIG. 2 is a block diagram showing the configuration of a processing device.

FIG. 2 is a block diagram showing the configuration of the processing device 80. As shown in FIG. 2, the processing device 80 includes upper limit temperature receivers 81, 82, a setter 83, a designated temperature receiver 84, a temperature adjuster 85, a preventer 86 and outputters 87, 88 as functions. The functions of the processing device 80 are implemented by execution of a predetermined program stored in a memory (not shown) by the CPU of the processing device 80. Part or all of the functions of the processing device 80 may be implemented by hardware such as an electronic circuit.

The upper limit temperature receiver 81 receives an input of a first temperature. The upper limit temperature receiver 82 receives an input of a second temperature lower than the first temperature. The upper limit temperature receivers 81, 82 are examples of an upper limit temperature receiver. The user can input the respective first and second temperatures to the respective upper limit temperature receivers 81, 82 by operating an operation unit such as a keyboard, a pointing device or an operation button provided in the liquid chromatograph 100.

The setter 83 acquires a result of determination of whether the chip column 2 is attached to the attachment portion 52 from the determiner 53. In a case in which the chip column 2 is not attached to the attachment portion 52, the setter 83 sets an upper limit temperature of the column oven 50 to the first temperature received by the upper limit temperature receiver 81. On the other hand, in a case in which the chip column 2 is attached to the attachment portion 52, the setter 83 sets an upper limit temperature of the column oven 50 to a second temperature received by the upper limit temperature receiver 82.

The designated temperature receiver 84 receives designation of a temperature of the column oven 50. The user can designate a desired operating temperature of the column oven 50 in the designated temperature receiver 84 by operating the operation unit provided in the liquid chromatograph 100. In a case in which a temperature received by the designated temperature receiver 84 is equal to or lower than an upper limit temperature set by the setter 83, the temperature adjuster 85 adjusts a temperature of the column oven 50 to the temperature received by the designated temperature receiver 84.

In a case in which a temperature received by the designated temperature receiver 84 exceeds a second temperature, the preventer 86 controls the attachment portion 52 such that attachment of the chip column 2 to the attachment portion 52 is prevented. For example, the attachment portion 52 may be controlled such that the insertion port of the chip column 2 is closed by a lid member. Alternatively, the attachment portion 52 may be controlled such that the chip column 2 is discharged from the insertion port at a point at which part of the chip column 2 is inserted into the insertion port. With this configuration, in a case in which a temperature received by the designated temperature receiver 84 exceeds a second temperature, the chip column 2 is prevented from being attached to the attachment portion 52.

In a case where a temperature received by the designated temperature receiver 84 exceeds a second temperature, the outputter 87 outputs a warning when an operation of attaching the chip column 2 to the attachment portion 52 is performed. In this case, when attaching the chip column 2 to the attachment portion 52, the user can recognize that a temperature received by the designated temperature receiver 84 exceeds a second temperature. Thus, the chip column 2 can be more protected appropriately. The operation of attaching the chip column 2 to the attachment portion 52 may be detected based on a result of determination by the determiner 53 or may be detected based on an operation of the lid member at the insertion port of the chip column 2.

The outputter 87 is an example of a first outputter. In a case in which the liquid chromatograph 100 includes a display device, a character string "The designated temperature exceeds the upper limit temperature. Please change the designated temperature," etc. may be displayed as a warning by the outputter 87. Alternatively, in a case in which the liquid chromatograph 100 includes a sound output device, a sound indicating the similar content may be output, or a warning sound such as a buzzer may be output. In a case in which the liquid chromatograph 100 includes an indicator light such as a lamp, the indicator light may be turned on or off, or may blink in a manner corresponding to the content of warning.

In a case in which an upper limit temperature is set to a second temperature by the setter 83, the outputter 88 outputs a warning when a temperature higher than the second temperature is received by the designated temperature receiver 84. In this case, the user can easily recognize designation of a temperature higher than the upper limit temperature. Thus, the user can easily designate an appropriate temperature in the designated temperature receiver 84.

The outputter 88 is an example of a second outputter. The manner of warning provided by the outputter 88 may be similar to the manner of warning provided by the outputter 87. Alternatively, as a warning provided by the outputter 88, a character string such as "The designated temperature exceeds the upper limit temperature. Please detach the chip column," etc. or a sound may be output.

(3) Temperature Control Process

Figure 3:
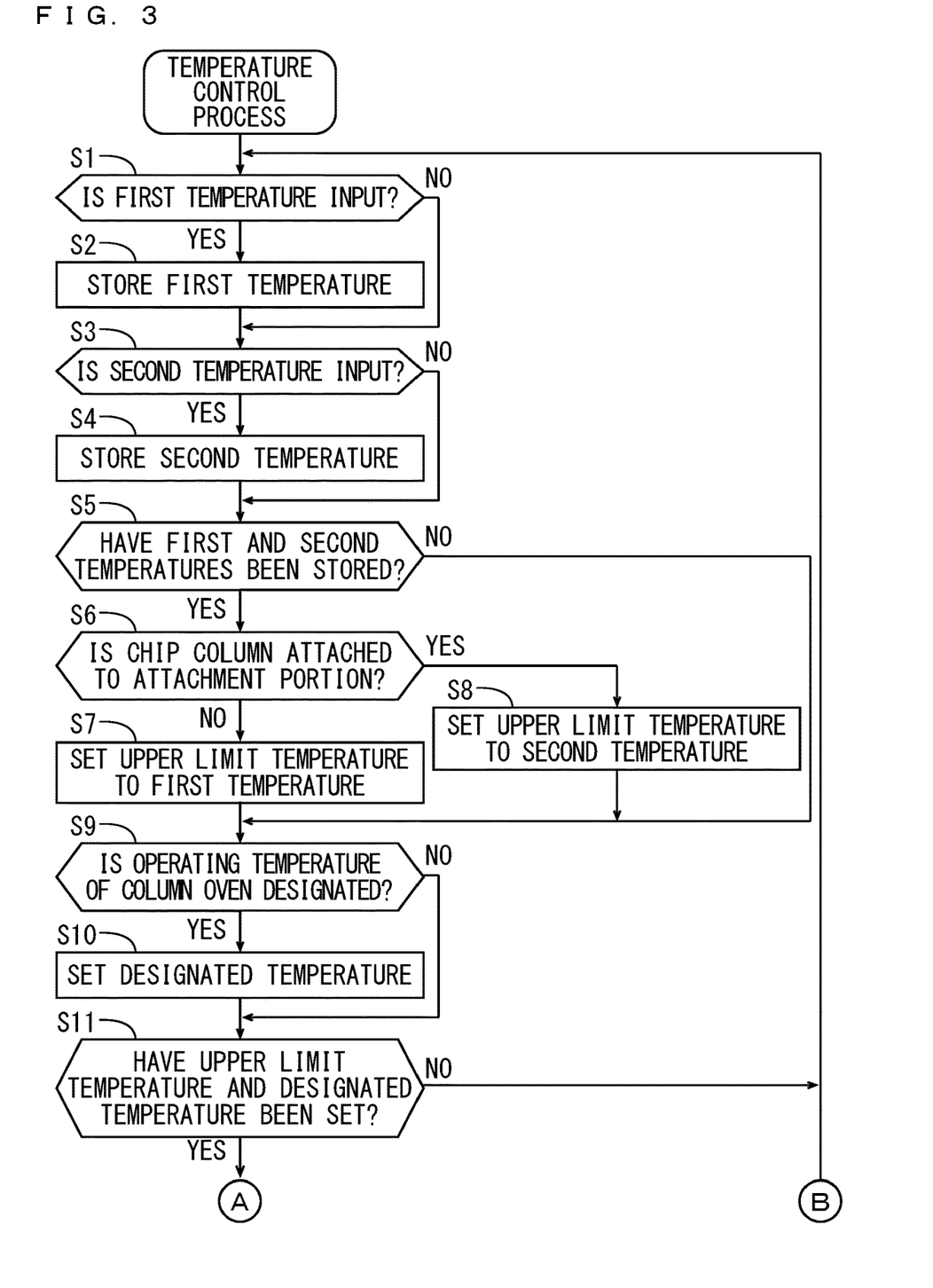
FIG. 3 is a flowchart showing one example of the algorithm of a temperature control process executed by the processing device of FIG. 2.
Figure 4:
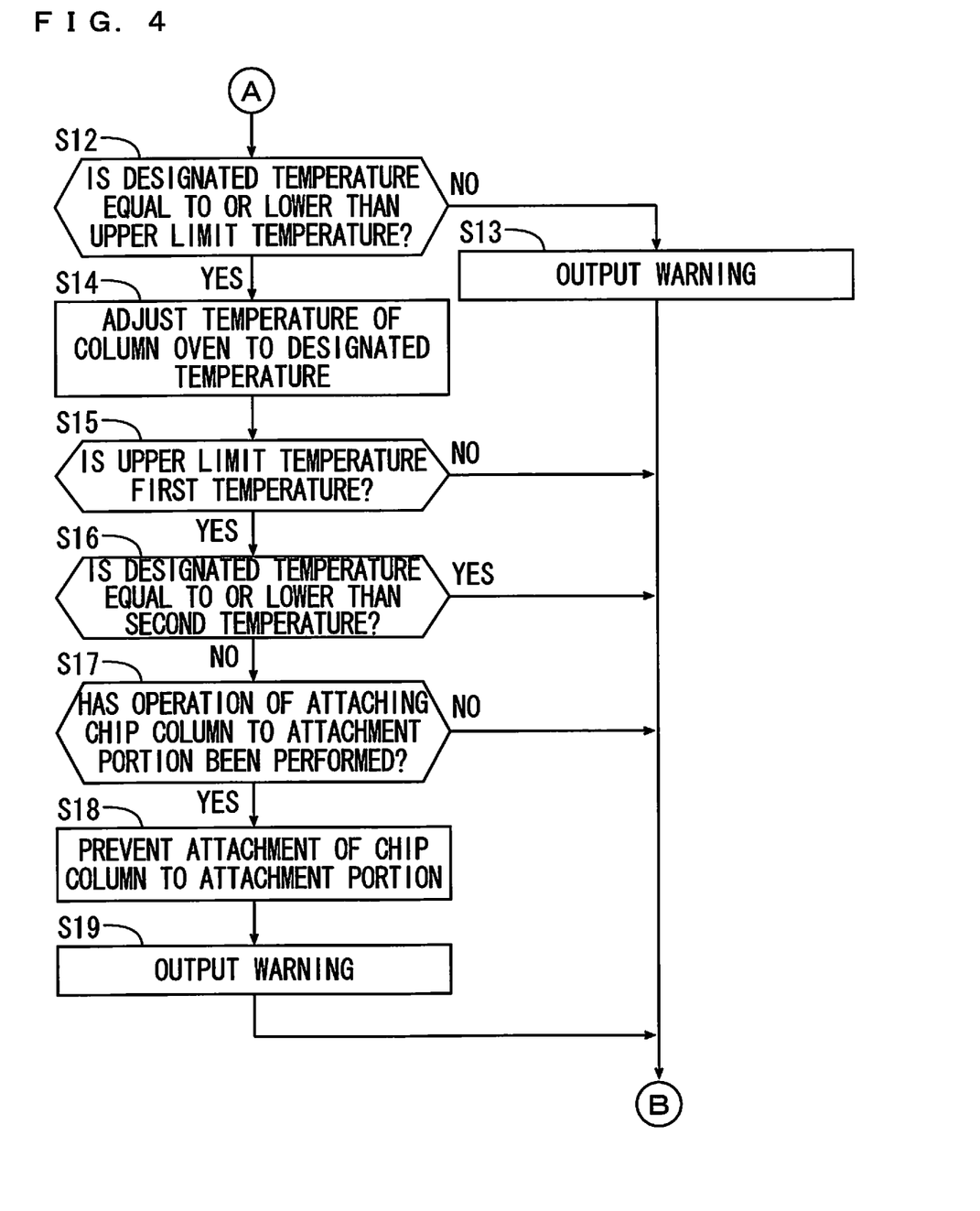
FIG. 4 is a flowchart showing one example of the algorithm of the temperature control process executed by the processing device of FIG. 2.
Figure 5:
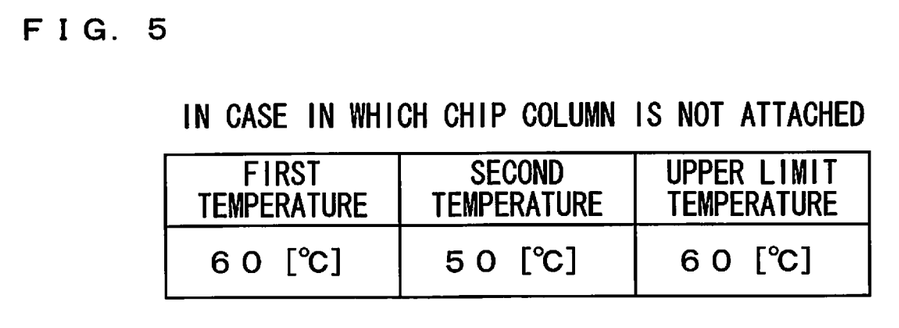
FIG. 5 is a table showing an example of setting of an upper limit temperature.
Figure 6:
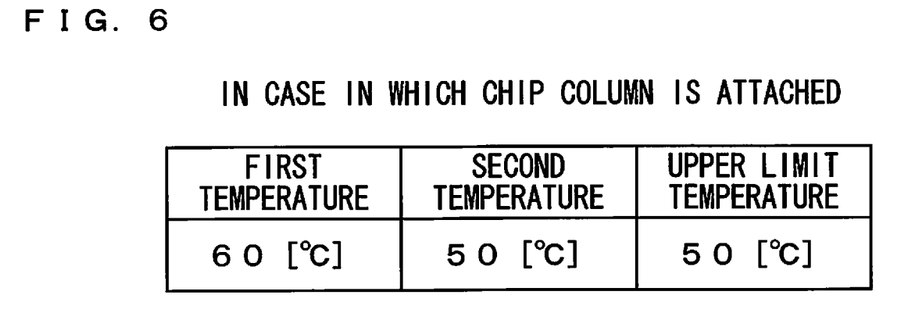
FIG. 6 is a table showing an example of setting of the upper limit temperature.

FIGS. 3 and 4 are flowcharts showing one example of the algorithm of a temperature control process executed by the processing device 80 of FIG. 2. FIGS. 5 and 6 are tables showing examples of setting of an upper limit temperature. The temperature control process will be described below with reference to FIGS. 2 to 6.

First, the upper limit temperature receiver 81 determines whether a first temperature has been input (step S1). The user can input a first temperature by operating the operation unit. In a case in which a first temperature is input, the upper limit temperature receiver 81 stores the input first temperature (step S2). In a case in which a first temperature is not input in the step S1 or a case in which a first temperature is stored in the step S2, the upper limit temperature receiver 81 proceeds to the step S3.

In the step S3, the upper limit temperature receiver 82 determines whether a second temperature has been input (step S3). The user can input a second temperature by operating the operation unit. In a case in which a second temperature is input, the upper limit temperature receiver 82 stores the input second temperature (step S4). In a case in which a second temperature is not input in the step S3 or a case in which a second temperature is stored in the step S4, the upper limit temperature receiver 82 proceeds to the step S5.

In the step S5, the setter 83 determines whether first and second temperatures have been stored (step S5). In the examples of FIGS. 5 and 6, 60° C. and 50° C. are stored as first and second temperatures, respectively. In a case in which first and second temperatures have not been stored, the setter 83 proceeds to the step S9. In a case in which first and second temperatures have been stored, the setter 83 determines whether the chip column 2 is attached to the attachment portion 52 (step S6). In the present example, the setter 83 executes the step S6 by acquiring a result of determination from the determiner 53.

In a case in which the chip column 2 is not attached to the attachment portion 52 (FIG. 5), the setter 83 sets an upper limit temperature to the first temperature stored in the step S2 (step S7) and proceeds to the step S9. On the other hand, in a case in which the chip column 2 is attached to the attachment portion 52 (FIG. 6), the setter 83 sets an upper limit temperature to the second temperature stored in the step S4 (step S8) and proceeds to the step S9.

In the step S9, the designated temperature receiver 84 determines whether an operating temperature of the column oven 50 has been designated (step S9). The user can designate an operating temperature by operating the operation unit. In a case in which an operating temperature is designated, the designated temperature receiver 84 sets the designated operating temperature as a designated temperature (step S10). In a case in which an operating temperature is not designated in the step S9 or a case in which a designated temperature is set in the step S10, the designated temperature receiver 84 proceeds to the step S11.

In the step S11, the temperature adjuster 85 determines whether an upper limit temperature and a designated temperature have been set (step S11). In a case in which an upper limit temperature and a designated temperature have not been set, the temperature adjuster 85 returns to the step S1. The steps S1 to S11 are repeated until an upper limit temperature and a designated temperature are set. In a case in which a first temperature, a second temperature or an operating temperature is changed in this repeated process, the setting for an upper limit temperature or a designated temperature is updated. The same applies to the subsequent repeated process.

In a case in which an upper limit temperature and a designated temperature have been set, the temperature adjuster 85 determines whether the designated temperature set in the step S10 is equal to or lower than the upper limit temperature set in the step S7 or the step S8 (step S12). In a case in which the designated temperature is not equal to or lower than an upper limit temperature, the outputter 88 outputs a warning (step S13) and returns to the step S1. The user can take measures such as changing a first temperature, a second temperature or an operating temperature, or detaching the chip column 2 by recognizing the warning.

In a case in which the designated temperature is equal to or lower than the upper limit temperature, the temperature adjuster 85 adjusts a temperature of the column oven 50 to the designated temperature (step S14). The temperature adjuster 85 determines whether the upper limit temperature is a first temperature (step S15). In a case in which the upper limit temperature is not the first temperature, the temperature adjuster 85 returns to the step S1. A upper limit temperature not being a first temperature means that the upper limit temperature is a second temperature and the chip column 2 is attached to the attachment portion 52 (FIG. 6).

In a case in which an upper limit temperature is a first temperature, that is, the chip column 2 is not attached to the attachment portion 52 (FIG. 5), the temperature adjuster 85 determines whether a designated temperature is equal to or lower than a second temperature (step S16). In a case in which the designated temperature is equal to or lower than the second temperature, the temperature adjuster 85 returns to the step S1. In a case in which the designated temperature is not equal to or lower than the second temperature, the temperature adjuster 85 determines whether an operation of attaching the chip column 2 to the attachment portion 52 has been performed (step S17).

In a case in which the operation of attaching the chip column 2 has not been performed, the temperature adjuster 85 returns to the step S1. On the other hand, in a case in which the operation of attaching the chip column 2 has been performed, the preventer 86 controls the attachment portion 52 to prevent attachment of the chip column 2 to the attachment portion 52 (step S18). In this case, the chip column 2 is prevented from being attached to the attachment portion 52. Thus, the chip column 2 can be protected appropriately.

Further, the outputter 87 outputs a warning (step S19) and returns to the step S1. The user can easily understand that the designated temperature exceeds the upper limit temperature by recognizing the warning. Further, the user can take measures such as changing a first temperature, a second temperature or an operating temperature. Either the step S18 or S19 may be executed first, or the steps S18 and S19 may be executed at the same time.

(4) Effects

In the liquid chromatograph 100 according to the present embodiment, the attachment portion 51 to which the packed column 1 can be attached and the attachment portion 52 to which the chip column 2 can be attached are accommodated in the column oven 50. Designation of a temperature of the column oven 50 is received by the designated temperature receiver 84.

Here, in a case in which the chip column 2 is not attached to the attachment portion 52, an upper limit temperature of the column oven 50 is set to a first temperature by the setter 83. Further, in a case in which the chip column 2 is attached to the attachment portion 52, an upper limit temperature of the column oven 50 is set to a second temperature lower than a first temperature by the setter 83. In a case in which a temperature received by the designated temperature receiver 84 is equal to or lower than the upper limit temperature set by the setter 83, a temperature of the column oven 50 is adjusted to the received temperature by the temperature adjuster 85.

With this configuration, in a case in which the chip column 2 is not attached to the attachment portion 52, the upper limit temperature of the column oven 50 is set to the first temperature. In this case, an analysis of a sample can be performed even under a high-temperature condition by attachment of the packed column 1 to the attachment portion 51.

On the other hand, in a case in which the chip column 2 is attached to the attachment portion 52, the upper limit temperature of the column oven 50 is set to the second temperature. Therefore, the chip column 2 is prevented from being used under a high-temperature condition. Even in a case in which either the packed column 1 or the chip column 2 is used, a sample can be analyzed. In this manner, a temperature of the liquid chromatograph 100 can be managed appropriately.

(5) Other Embodiments (a) While the flow path switcher 40 selectively leads out a mobile phase that has been introduced into the inlet port 41 from the outlet port 42 or the outlet port 43 in the above-mentioned embodiment, the embodiment is not limited to this. The flow path switcher 40 may lead out a mobile phase that has been introduced into the inlet port 41 from the outlet port 42 and the outlet port 43 at the same time. In this case, an analysis of a sample using the packed column 1 and an analysis of a sample using the chip column 2 can be performed at the same time.

(b) While the setter 83 sets an upper limit temperature of the column oven 50 to a first temperature or a second temperature based on a result of determination by the determiner 53 in the above-mentioned embodiment, the embodiment is not limited to this. For example, the setter 83 may acquire a notification about whether the chip column 2 is attached to the attachment portion 52 from the user and set an upper limit temperature of the column oven 50 to a first temperature or a second temperature based on a result of notification. In this case, the liquid chromatograph 100 does not have to include the determiner 53.

(c) While the processing device 80 includes both of the upper limit temperature receivers 81, 82 in the above-mentioned embodiment, the embodiment is not limited to this. In a case in which a second temperature is set based on a first temperature or a case in which a second temperature is predetermined, the processing device 80 does not have to include the upper limit temperature receiver 82. In a case in which a first temperature is set based on a second temperature or a case in which a first temperature is predetermined, the processing device 80 does not have to include the upper limit temperature receiver 81. In a case in which both of first and second temperatures are predetermined, the liquid chromatograph 100 does not have to include both of the upper limit temperature receivers 81, 82.

(d) While the processing device 80 includes both of the preventer 86 and the outputter 87 in the above-mentioned embodiment, the embodiment is not limited to this. The processing device 80 does not have to include either the preventer 86 or the outputter 87, and does not have to include both of the preventer 86 and the outputter 87.

(e) While the processing device 80 includes the outputter 88 in the above-mentioned embodiment, the embodiment is not limited to this. The processing device 80 does not have to include the outputter 88.

(6) Aspects

It is understood by those skilled in the art that the plurality of above-mentioned illustrative embodiments are specific examples of the below-mentioned aspects.

(Item 1) A liquid chromatograph according to one aspect may include a first attachment portion to which a packed column is attachable, a second attachment portion to which a chip column having a flow path that functions as a separation column on a substrate is attachable, a column oven that houses the first and second attachment portions, a designated temperature receiver that receives designation of a temperature of the column oven, a setter that sets an upper limit temperature of the column oven to a first temperature in a case in which the chip column is not attached to the second attachment portion, and sets an upper limit temperature of the column oven to a second temperature lower than the first temperature in a case in which the chip column is attached to the second attachment portion, and a temperature adjuster that adjusts a temperature of the column oven to a temperature received by the designated temperature receiver in a case in which the temperature received by the designated temperature receiver is equal to or lower than an upper limit temperature set by the setter.

In this liquid chromatograph, the first attachment portion to which the packed column can be attached and the second attachment portion to which the chip column having the flow path that functions as a separation column on a substrate can be attached are housed in the column oven. Designation of a temperature of the column oven is received by the designated temperature receiver. In a case in which the chip column is not attached to the second attachment portion, an upper limit temperature of the column oven is set to a first temperature by the setter. In a case in which the chip column is attached to the second attachment portion, an upper limit temperature of the column oven is set to a second temperature lower than the first temperature by the setter. In a case in which a temperature received by the designated temperature receiver is equal to or lower than the upper limit temperature set by the setter, the temperature of the column oven is adjusted to the received temperature by the temperature adjuster.

With this configuration, in a case in which the chip column is not attached to the second attachment portion, the upper limit temperature of the column oven is set to the first temperature higher than the second temperature. In this case, a sample can be analyzed even under a high-temperature condition by attachment of the packed column to the first attachment portion. On the other hand, in a case in which the chip column is attached to the second attachment portion, the upper limit temperature of the column oven is set to the second temperature. Therefore, the chip column is prevented from being used under a high-temperature condition, and a sample can be analyzed even in a case in which either the packed column or the chip column is used. In this manner, the temperature of the liquid chromatograph can be controlled appropriately.

(Item 2) The liquid chromatograph according to item 1 may further include determiner that determines whether the chip column is attached to the second attachment portion, wherein the setter may set an upper limit temperature of the column oven to the first temperature or the second temperature based on a result of determination by the determiner.

In this case, the setter can easily set the upper limit temperature of the column oven to the first temperature or the second temperature.

(Item 3) The liquid chromatograph according to item 1 or 2, may further include an upper limit temperature receiver that receives designation of at least one of the first temperature and the second temperature to be set by the setter.

In this case, the upper limit temperature of the column oven can be set to any temperature.

(Item 4) The liquid chromatograph according to any one of items 1 to 3, may further include a preventer that controls the second attachment portion to prevent attachment of the chip column to the second attachment portion in a case in which a temperature received by the designated temperature receiver exceeds the second temperature.

With this configuration, in a case in which a temperature received by the designated temperature receiver exceeds the second temperature, the chip column is prevented from being attached to the second attachment portion. Thus, the chip column can be more protected appropriately.

(Item 5) The liquid chromatograph according to any one of items 1 to 4, may further include a first outputter that outputs a first warning when an operation of attaching the chip column to the second attachment portion is performed, in a case in which a temperature received by the designated temperature receiver exceeds the second temperature.

In this case, when attaching the chip column to the second attachment portion, the user can recognize that the temperature received by the designated temperature receiver exceeds the second temperature. Thus, the chip column can be protected more appropriately.

(Item 6) The liquid chromatograph according to any one of items 1 to 5, may further include a second outputter that outputs a second warning when a temperature higher than the second temperature is received by the designated temperature receiver, in a case in which an upper limit temperature is set to the second temperature by the setter.

In this case, the user can easily recognize that a temperature higher than the upper limit temperature has been designated. Thus, the user can easily designate an appropriate temperature in the designated temperature receiver.

(Item 7) An analysis method according to another aspect is an analysis method performed by a liquid chromatograph, wherein a first attachment portion to which a packed column may be attachable and a second attachment portion to which a chip column having a flow path that functions as a separation column on a substrate is attachable are housed in a column oven, and the analysis method may include the steps of receiving designation of a temperature of the column oven, setting an upper limit temperature of the column oven to a first temperature in a case in which the chip column is not attached to the second attachment portion, and setting an upper limit temperature of the column oven to a second temperature lower than the first temperature in a case in which the chip column is attached to the second attachment portion, and adjusting a temperature of the column oven to a received temperature in a case in which the received temperature is equal to or lower than a set upper limit temperature.

With this analysis method, in a case in which the chip column is not attached to the second attachment portion, the upper limit temperature of the column oven is set to the first temperature higher than the second temperature. In this case, a sample can be analyzed even under a high-temperature condition by attachment of the packed column to the first attachment portion. On the other hand, in a case in which the chip column is attached to the second attachment portion, the upper limit temperature of the column oven is set to the second temperature. Therefore, the chip column is prevented from being used under a high-temperature condition. In this manner, the temperature of the liquid chromatograph can be controlled appropriately.

The invention claimed is:

1. A liquid chromatograph comprising:
   a first attachment portion to which a packed column is attachable;
   a second attachment portion to which a chip column having a flow path that functions as a separation column on a substrate is attachable;
   a column oven that houses the first and second attachment portions;
   a designated temperature receiver that receives designation of a temperature of the column oven;
   a setter that sets an upper limit temperature of the column oven to a first temperature in a case in which the chip column is not attached to the second attachment portion, and sets an upper limit temperature of the column oven to a second temperature lower than the first temperature in a case in which the chip column is attached to the second attachment portion; and
   a temperature adjuster that adjusts a temperature of the column oven to a temperature received by the designated temperature receiver in a case in which the temperature received by the designated temperature receiver is equal to or lower than an upper limit temperature set by the setter.

2. The liquid chromatograph according to claim 1, further comprising a determiner that determines whether the chip column is attached to the second attachment portion, wherein
   the setter sets an upper limit temperature of the column oven to the first temperature or the second temperature based on a result of determination by the determiner.

3. The liquid chromatograph according to claim 1, further comprising an upper limit temperature receiver that receives designation of at least one of the first temperature and the second temperature to be set by the setter.

4. The liquid chromatograph according to claim 1, further comprising a preventer that controls the second attachment portion to prevent attachment of the chip column to the second attachment portion in a case in which a temperature received by the designated temperature receiver exceeds the second temperature.

5. The liquid chromatograph according to claim 1, further comprising a first outputter that outputs a first warning when an operation of attaching the chip column to the second attachment portion is performed, in a case in which a temperature received by the designated temperature receiver exceeds the second temperature.

6. The liquid chromatograph according to claim 1, further comprising a second outputter that outputs a second warning when a temperature higher than the second temperature is received by the designated temperature receiver, in a case in which an upper limit temperature is set to the second temperature by the setter.

7. An analysis method performed by a liquid chromatography wherein
- a first attachment portion to which a packed column is attachable and a second attachment portion to which a chip column having a flow path that functions as a separation column on a substrate is attachable are housed in a column oven, and
- the analysis method includes the steps of
- receiving designation of a temperature of the column oven,
- setting an upper limit temperature of the column oven to a first temperature in a case in which the chip column is not attached to the second attachment portion, and setting an upper limit temperature of the column oven to a second temperature lower than the first temperature in a case in which the chip column is attached to the second attachment portion, and
- adjusting a temperature of the column oven to a received temperature in a case in which the received temperature is equal to or lower than a set upper limit temperature.

* * * * *